United States Patent
Ross

(10) Patent No.: US 12,060,140 B2
(45) Date of Patent: *Aug. 13, 2024

(54) MARINE VESSEL WITH GYROSCOPE-OPTIMIZED STATION KEEPING

(71) Applicant: Brunswick Corporation, Mettawa, IL (US)

(72) Inventor: Walter B. Ross, Middlebury, IN (US)

(73) Assignee: Brunswick Corporation, Mettawa, IL (US)

( * ) Notice: Subject to any disclaimer, the term of this patent is extended or adjusted under 35 U.S.C. 154(b) by 363 days.

This patent is subject to a terminal disclaimer.

(21) Appl. No.: 17/391,796

(22) Filed: Aug. 2, 2021

(65) Prior Publication Data

US 2023/0033185 A1 Feb. 2, 2023

(51) Int. Cl.
| | | |
|---|---|---|
| *G01C 21/18* | (2006.01) | |
| *B63B 39/04* | (2006.01) | |
| *B63B 79/40* | (2020.01) | |
| *B63H 21/21* | (2006.01) | |

(52) U.S. Cl.
CPC .............. *B63B 79/40* (2020.01); *B63B 39/04* (2013.01); *B63H 21/21* (2013.01); *G01C 21/18* (2013.01)

(58) Field of Classification Search
CPC ......... G01C 21/18; B63B 79/40; B63B 39/04; B63H 21/21; B63H 25/42; B63H 2025/026
See application file for complete search history.

(56) References Cited

U.S. PATENT DOCUMENTS

| | | | |
|---|---|---|---|
| 4,918,628 A * | 4/1990 | Griffin | B63B 39/14 340/623 |
| 5,787,832 A * | 8/1998 | Spinka | B63B 43/14 114/123 |
| 6,973,847 B2 | 12/2005 | Adams et al. | |
| 7,305,928 B2 | 12/2007 | Bradley et al. | |
| 8,417,399 B2 | 4/2013 | Arbuckle | |
| 8,478,464 B2 | 7/2013 | Arbuckle et al. | |
| 8,924,054 B1 | 12/2014 | Arbuckle et al. | |
| 9,422,034 B2 * | 8/2016 | Bauer | B63B 21/26 |
| 10,437,248 B1 | 10/2019 | Ross et al. | |
| 10,671,073 B2 | 6/2020 | Arbuckle et al. | |
| 10,926,855 B2 | 2/2021 | Derginer et al. | |
| 11,493,391 B2 * | 11/2022 | Sanger | G01K 13/00 |

(Continued)

OTHER PUBLICATIONS

Poh et al., Gyroscopic stabilisation of rolling motion in simplified marine hull model, 2017, IEEE, p. 1-6 (Year: 2017).*

(Continued)

*Primary Examiner* — McDieunel Marc
(74) *Attorney, Agent, or Firm* — Andrus Intellectual Property Law, LLP

(57) ABSTRACT

A system for orienting a marine vessel is provided. The system includes marine propulsion devices, a gyroscopic stabilizer system, and a controller operably coupled to the marine propulsion devices and the gyroscopic stabilization system. The controller is configured to control operation of the marine propulsion devices to minimize a control torque output of the gyroscopic stabilizer system while maintaining the marine vessel in a selected global position and/or heading.

20 Claims, 10 Drawing Sheets

(56) References Cited

U.S. PATENT DOCUMENTS

| | | | |
|---|---|---|---|
| 11,675,372 B2* | 6/2023 | Derginer | G05D 1/0875 |
| | | | 701/21 |
| 2005/0274210 A1 | 12/2005 | Adams et al. | |
| 2020/0140052 A1 | 5/2020 | Derginer et al. | |
| 2020/0249678 A1 | 8/2020 | Arbuckle et al. | |
| 2023/0021635 A1* | 1/2023 | Gallagher | B63B 79/40 |
| 2023/0030018 A1* | 2/2023 | Ross | B63H 20/12 |

OTHER PUBLICATIONS

Kurowski et al., Multi-Vehicle Guidance, Navigation and Control Towards Autonomous Ship Maneuvering in Confined Waters, 2019, IEEE, p. 2559—(Year: 2019).*

Townsend et al., Control Strategies for Marine Gyrostabilizers, 2013, IEEE, p. 243-255 (Year: 2013).*

Townsend et al., A Gyroscopic Wave Energy Recovery System for Marine Vessels, 2012, IEEE, p. 271-280 (Year: 2012).*

\* cited by examiner

MARINE VESSEL WITH GYROSCOPE-OPTIMIZED STATION KEEPING

FIELD

The present disclosure relates to maneuvering systems for marine vessels, and more specifically, to systems and methods for operating propulsion and gyroscopic stabilization systems in concert to ensure efficient operation of the gyroscopic stabilization system when the marine vessel is operating in a station keeping mode.

BACKGROUND

U.S. Pat. No. 7,305,928 discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 8,417,399 discloses systems and methods for orienting a marine vessel that minimize at least one of pitch and roll in a station keeping mode. A control device having a memory and a programmable circuit is programmed to control operation of the plurality of marine propulsion devices to maintain orientation of a marine vessel in a selected global position and heading. The control device receives at least one of actual pitch and actual roll of the marine vessel in the global position and controls operation of the plurality of marine propulsion units to change the heading of the marine vessel to minimize at least one of the actual pitch and the actual roll while maintaining the marine vessel in the selected global position.

U.S. Pat. No. 8,478,464 discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

U.S. Pat. No. 10,437,248 discloses a method of controlling position of a marine vessel in a body of water includes determining, at a control module, a relative heading instruction describing a position of the marine vessel relative to a position of the sun. A target global position for the marine vessel is received, and a position of the sun relative to the target global position is determined based on a current date and a current time. A sun adjusted heading is calculated for the marine vessel based on the position of the sun and the relative heading instruction. A current heading of the marine vessel is determined, and propulsion devices on the marine vessel are controlled to position the marine vessel at the target global position and align the current heading of the marine vessel at the sun adjusted heading.

U.S. Pat. No. 10,671,073 discloses a method for maintaining a marine vessel at a global position and/or heading includes receiving measurements related to vessel attitude and estimating water roughness conditions based on the measurements. A difference between the vessel's actual global position and the target global position and/or a difference between the vessel's actual heading and the target heading are determined. The method includes calculating a desired linear velocity based on the position difference and/or a desired rotational velocity based on the heading difference. The vessel's actual linear velocity and/or actual rotational velocity are filtered based on the roughness conditions. The method includes determining a difference between the desired linear velocity and the filtered actual linear velocity and/or a difference between the desired rotational velocity and the filtered actual rotational velocity. The method also includes calculating vessel movements that will minimize the linear velocity difference and/or rotational velocity difference and carrying out the calculated movements.

U.S. Pat. No. 10,926,855 discloses a method for controlling low-speed propulsion of a marine vessel powered by a marine propulsion system having a plurality of propulsion devices includes receiving a signal indicating a position of a manually operable input device movable to indicate desired vessel movement within three degrees of freedom, and associating the position of the manually operable input device with a desired inertial velocity of the marine vessel. A steering position command and an engine command are then determined for each of the plurality of propulsion devices based on the desired inertial velocity and the propulsion system is controlled accordingly. An actual velocity of the marine vessel is measured and a difference between the desired inertial velocity and the actual velocity is determined, where the difference is used as feedback in subsequent steering position command and engine command determinations.

U.S. Patent Publication No. 2020/0140052 discloses a method for controlling low-speed propulsion of a marine vessel powered by a marine propulsion system having a plurality of propulsion devices that includes receiving a signal indicating a position of a manually operable input device movable to indicate desired vessel movement within three degrees of freedom, and associating the position of the manually operable input device with a desired inertial velocity of the marine vessel. A steering position command and an engine command are then determined for each of the plurality of propulsion devices based on the desired inertial velocity and the propulsion system is controlled accordingly. An actual velocity of the marine vessel is measured and a difference between the desired inertial velocity and the actual velocity is determined, where the difference is used as feedback in subsequent steering position command and engine command determinations.

The above patents and patent publications are hereby incorporated by reference in their entireties.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one implementation of the present disclosure, a system for orienting a marine vessel is provided. The system includes marine propulsion devices, a gyroscopic stabilizer system, and a controller operably coupled to the marine propulsion devices and the gyroscopic stabilization system. The controller is configured to control operation of the marine propulsion devices to minimize a control torque output of the gyroscopic stabilizer system while maintaining the marine vessel in a selected global position.

According to another implementation of the present disclosure, a method for orienting a marine vessel is provided. The method includes determining a first control torque output of a gyroscopic stabilizer system, changing a heading of the marine vessel by a predetermined heading amount in a first direction by operating multiple marine propulsion devices, and determining a second control torque output of the gyroscopic stabilizer system. The method further includes repeating the preceding steps if the first control torque output is greater than the second control torque output by at least a predetermined change amount.

BRIEF DESCRIPTION OF THE DRAWINGS

The present disclosure is described with reference to the following Figures. The same numbers are used throughout the Figures to reference like features and like components.

DETAILED DESCRIPTION

Figure 2:
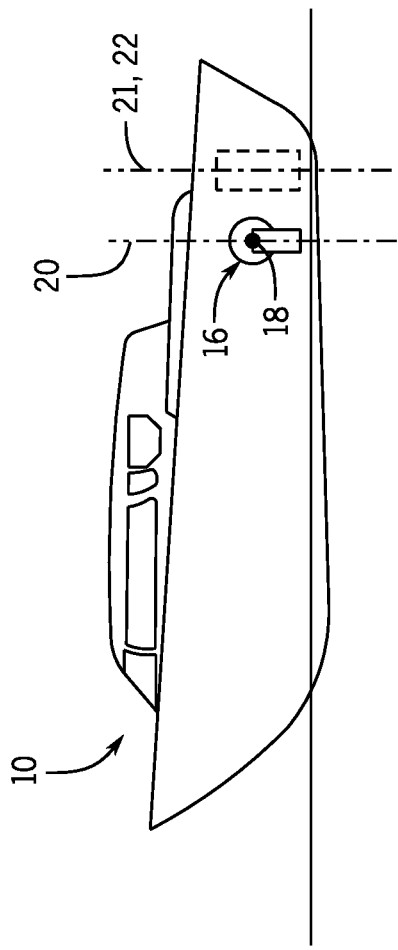
FIG. 2 is a schematic side view representation of the marine vessel of FIG. 1.

In the present description, certain terms have been used for brevity, clearness and understanding. No unnecessary limitations are to be inferred therefrom beyond the requirement of the prior art because such terms are used for descriptive purposes only and are intended to be broadly construed.

FIGS. 1-15 depict various embodiments of marine vessels and control systems for orienting and maneuvering the marine vessels. It should be understood that the particular configurations of the marine vessels and control systems are exemplary. It is possible to apply the concepts described in the present disclosure with substantially different configurations of marine vessels and/or control systems. For example, the marine vessels that are depicted in the drawing figures have first and second marine propulsion devices 27, 28 that have limited ranges or rotation. However, it should be understood that the concepts disclosed in the present disclosure are applicable to marine vessels having any number of marine propulsion devices and any configuration of a propulsion device, such as outboard marine drives, inboard drive, stern drives, pod drives, or the like. Further, the present disclosure describes certain types of user input devices (e.g., a joystick 50). However, it should also be recognized that the concepts disclosed in the present disclosure are able to function in conjunction with different types of user input devices, as would be known to one of skill in the art. Further equivalents, alternatives, and modifications are also possible as would be recognized by those skilled in the art.

Figure 1:
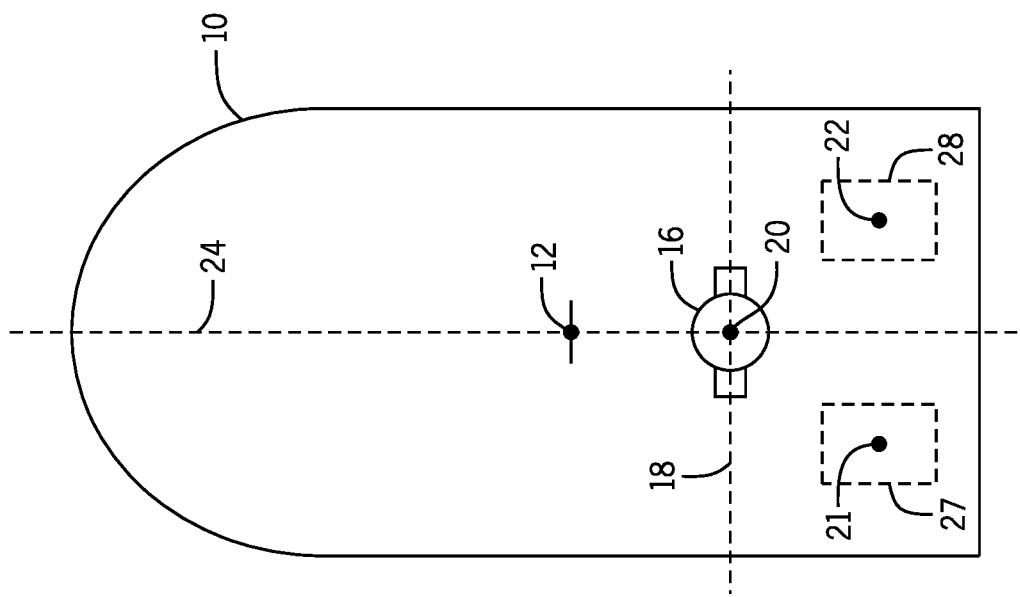
FIG. 1 is a schematic top view representation of a marine vessel having marine propulsion devices and a gyroscopic stabilizer device.

FIGS. 1 and 2 respectively depict schematic top and side view representations of a marine vessel 10 having a center of gravity 12. First and second steering axes, 21 and 22, are illustrated to represent the location of first and second marine propulsion devices 27 and 28 located under the hull of the marine vessel 10. The first and second marine propulsion devices 27 and 28 are rotatable about the first and second steering axes, 21 and 22, respectively. The first marine propulsion device 27, on the port side of a centerline 24, may be configured to be rotatable 45 degrees in a clockwise direction, viewed from above the marine vessel 10, and 15 degrees in a counterclockwise direction. The second marine propulsion device 28, located on the starboard side of the centerline 24, may be oppositely configured to rotate 15 degrees in a clockwise direction and 45 degrees in a counterclockwise direction.

FIGS. 1 and 2 additionally depict a gyroscopic stabilizer 16 that may be utilized to suppress unwanted disruptions to the orientation of the marine vessel 10 due to the forces of waves, wakes, or wind acting upon the marine vessel 10. The gyroscopic stabilizer 16 suppresses these unwanted motions by producing a stabilizing torque through controlled precession of stored angular momentum of a spinning flywheel. For example, if the gyroscopic stabilizer 16 is utilized to control roll motions of the marine vessel 10 (i.e., rotations about the centerline 24), the flywheel within the gyroscopic stabilizer 16 may spin about a vertical spin axis 20. Conservation of the angular momentum of the flywheel causes the flywheel to precess about a gimbal or precession axis 18 that is oriented across the width of the vessel, orthogonal to the spin axis 20. By controlling the precession rate about the gimbal axis 18, a control torque about the centerline 24 is induced that is directly proportional to the flywheel rotational moment of inertia about the spin axis 20, the flywheel angular velocity, and the precession rate about the gimbal axis 18. The direction of the control torque opposes the direction of the roll torque, thereby dampening any resulting roll motion induced by the roll torque, and providing the occupants of the marine vessel 10 with a more comfortable experience.

Other orientations of the gyroscopic stabilizer 16 are possible to induce an identical roll-opposing torque. For example, the gyroscopic stabilizer 16 may instead be oriented such that the flywheel rotates about axis 18 and precesses about axis 20. In addition, in an exemplary implementation, the structure of the gyroscopic stabilizer 16 may permit accommodation of any desired orientation of the spin and gimbal axes, such that the gyroscopic stabilizer 16 is oriented in real time to dampen unwanted roll, pitch, and yaw motions of the marine vessel 10. Such gyroscopic stabilizers for marine vessels, also known as control moment gyroscopes (CMGs), are known in the art and manufactured by various suppliers (e.g., Seakeeper, VEEM Gyro).

Although, gyroscopic stabilizers or CMGs are known in the art for their use in dampening unwanted movements of marine vessels, the utility of integrating station keeping maneuvers with optimization of the control torques generated by gyroscopic stabilizers has not been previously realized. Currently, if a gyroscopic stabilizer is operational during station keeping, the control system will generally maintain a selected heading of the marine vessel, regardless of the magnitude of the control torques generated by the gyroscopic stabilizer. This arrangement is inefficient, as modifications to the heading of the marine vessel may greatly decrease the pitch or roll motions experienced by the marine vessel that depend on such factors as the geometry of the marine vessel, as well as the direction and frequency of waves. By decreasing the pitch or roll experienced by the marine vessel, the magnitude of the control torque generated by the gyroscopic stabilizer can be correspondingly reduced, resulting in lower energy expenditure by the gyroscopic stabilizer. The present inventor has recognized that by enabling the control system of the marine vessel to perform a heading search process, the control torques generated by a gyroscopic stabilizer may be optimized, thereby resulting in more efficient use of energy, as well as a more comfortable experience for the occupants of the marine vessel.

Referring now to FIGS. 3-6, an overview of the thrusts and moments induced by the marine propulsion devices 27 and 28 to achieve desired movements of the marine vessel 10 is provided. For the purposes of simplicity, the effects of the gyroscopic stabilizer 16 on the marine vessel 10 on these close quarter movements are not addressed herein, but are described in further detail below with reference to FIGS. 14 and 15.

Figure 3:
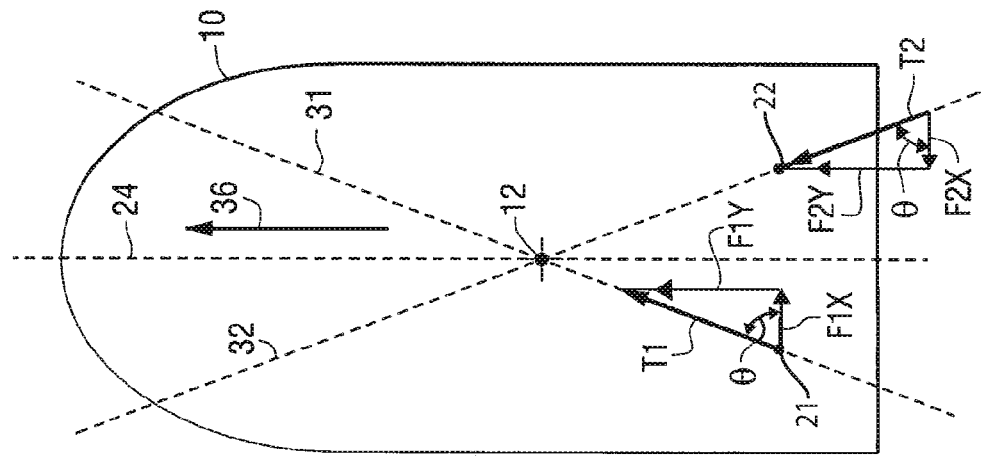
FIG. 3 illustrates the arrangement of thrust vectors during a sidle movement of the marine vessel of FIG. 1.

FIG. 3 illustrates one element of the present disclosure that is used when it is desired to move the marine vessel 10 in a direction represented by arrow 30. In other words, it represents the situation when the operator of the marine vessel wishes to cause it to sidle to the right with no movement in either a forward or reverse direction and no rotation about its center of gravity 12. This is done by rotating the first and second marine propulsion devices so that their thrust vectors, T1 and T2, are both aligned with the center of gravity 12. This provides no effective moment arm about the center of gravity 12 for the thrust vectors, T1 and T2, to exert a force that could otherwise cause the marine vessel 10 to rotate. The first and second thrust vectors, T1 and T2, are in opposite directions and are equal in magnitude to each other. This creates no resultant forward or reverse force on the marine vessel 10. The first and second thrust vectors are directed along lines 31 and 32, respectively, which intersect at the center of gravity 12. As illustrated in FIG. 3, these two lines, 31 and 32, are positioned at angles θ. As such, the first and second marine propulsion devices are rotated symmetrically relative to the centerline 24. As will be described in greater detail below, the first and second thrust vectors, T1 and T2, can be resolved into components, parallel to centerline 24, that are calculated as a function of the sine of angle θ. These thrust components in a direction parallel to centerline 24 effectively cancel each other if the thrust vectors, T1 and T2, are equal to each other since the absolute magnitudes of the angles θ are equal to each other. Movement in the direction represented by arrow 30 results from the components of the first and second thrust vectors, T1 and T2, being resolved in a direction parallel to arrow 30 (i.e. perpendicular to centerline 24) as a function of the cosine of angle θ. These two resultant thrust components which are parallel to arrow 30 are additive. As described above, the moment about the center of gravity 12 is equal to zero because both thrust vectors, T1 and T2, pass through the center of gravity 12 and, as a result, have no moment arms about that point.

While it is recognized that many other positions of the thrust, T1 and T2, may result in the desired sidling represented by arrow 30, the direction of the thrust vectors in line with the center of gravity 12 of the marine vessel 10 is most effective and is easy to implement. It also minimizes the overall movement of the propulsion devices during complicated maneuvering of the marine vessel 10. Its effectiveness results from the fact that the magnitudes of the first and second thrusts need not be perfectly balanced in order to avoid the undesirable rotation of the marine vessel 10. Although a general balancing of the magnitudes of the first and second thrusts is necessary to avoid the undesirable forward or reverse movement, no rotation about the center of gravity 12 will occur as long as the thrusts are directed along lines, 31 and 32, which intersect at the center of gravity 12 as illustrated in FIG. 3.

FIG. 3 shows the first and second thrust vectors, T1 and T2, and the resultant forces of those two thrust vectors. For example, the first thrust vector can be resolved into a forward directed force F1Y and a side directed force F1X as shown in FIG. 3 by multiplying the first thrust vector T1 by the sine of θ and the cosine of θ, respectively. Similarly, the second thrust vector T2 is shown resolved into a rearward directed force F2Y and a side directed force F2X by multiplying the second thrust vector T2 by the sine of θ and cosine of θ, respectively. Since the forward force F1Y and rearward force F2Y are equal to each other, they cancel and no resulting forward or reverse force is exerted on the marine vessel 10. The side directed forces, F1X and F2X, on the other hand, are additive and result in the sidle movement represented by arrow 30. Because the lines, 31 and 32, intersect at the center of gravity 12 of the marine vessel 10, no resulting moment is exerted on the marine vessel. As a result, the only movement of the marine vessel 10 is the sidle movement represented by arrow 30.

Figure 4:
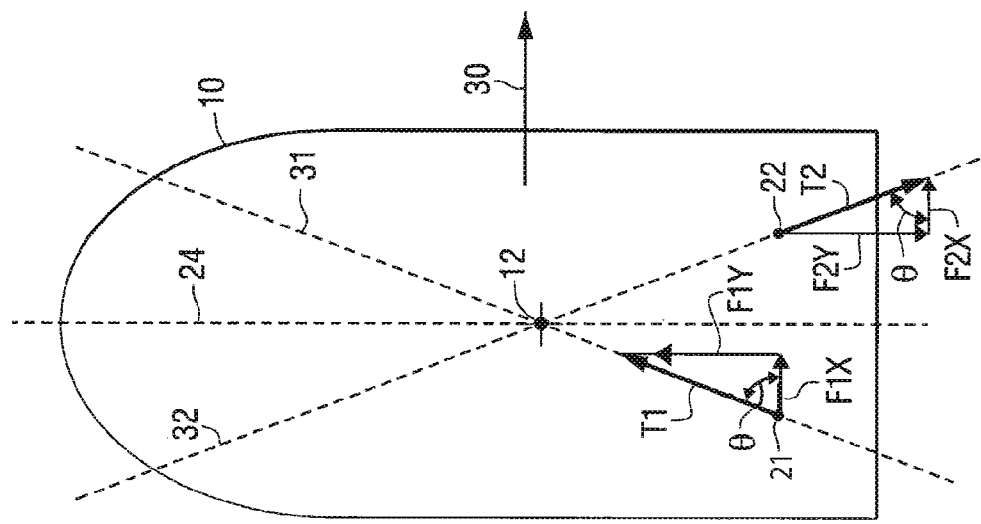
FIG. 4 illustrates the arrangement of thrust vectors during a forward movement of the marine vessel of FIG. 1.

FIG. 4 shows the result when the operator of the marine vessel 10 wishes to move in a forward direction, with no side movement and no rotation about the center of gravity 12. The first and second thrusts, T1 and T2, are directed along their respective lines, 31 and 32, and they intersect at the center of gravity 12. Both thrusts, T1 and T2, are exerted in a generally forward direction along those lines. As a result, these thrusts resolve into the forces illustrated in FIG. 4. Side directed forces F1X and F2X are equal to each other and in opposite directions. Therefore, they cancel each other and no sidle force is exerted on the marine vessel 10. Forces F1Y and F2Y, on the other hand, are both directed in a forward direction and result in the movement represented by arrow 36. The configuration of the first and second marine propulsion systems represented in FIG. 4 result in no side directed movement of the marine vessel 10 or rotation about its center of gravity 12. Only a forward movement 36 occurs.

Figure 5:
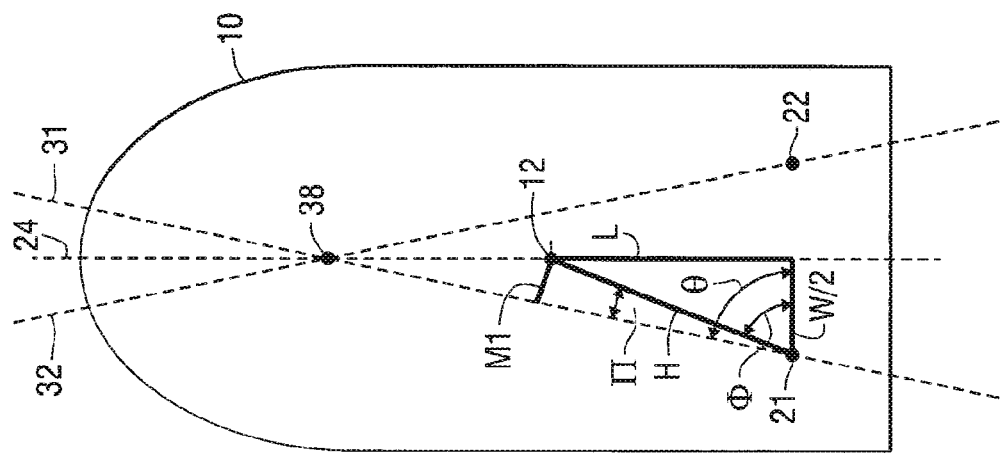
FIG. 5 illustrates the geometry associated with the calculation of a moment arm relative to the center of gravity of the marine vessel of FIG. 1.

When a rotation or yaw motion of the marine vessel 10 is desired in combination with linear movement, the first and second marine propulsion devices are rotated so that their thrust vectors intersect at a point on the centerline 24 other than the center of gravity 12 of the marine vessel 10. This is illustrated in FIG. 5. Although the thrust vectors, T1 and T2, are not shown in FIG. 5, their associated lines, 31 and 32, are shown intersecting at a point 38 which is not coincident with the center of gravity 12. As a result, an effective moment arm M1 exists with respect to the first marine propulsion device which is rotated about its first steering axis 21. Moment arm M1 is perpendicular to dashed line 31 along which the first thrust vector is aligned. As such, it is one side of a right triangle which also comprises a hypotenuse H. It should also be understood that another right triangle in FIG. 5 comprises sides L, W/2, and the hypotenuse H. Although not shown in FIG. 5, for purposes of clarity, a moment arm M2 of equal magnitude to moment arm M1 would exist with respect to the second thrust vector directed along line 32. Because of the intersecting nature of the thrust vectors, they each resolve into components in both the forward/reverse and left/right directions. The components, if equal in absolute magnitude to each other, may either cancel each other or be additive. If unequal in absolute magnitude, they may partially offset each other or be additive. However, a resultant force will exist in some linear direction when the first and second thrust vectors intersect at a point 38 on the centerline 24.

With continued reference to FIG. 5, those skilled in the art recognize that the length of the moment arm M1 can be determined as a function of angle θ, angle 1, angle H, the distance between the first and second steering axes, 21 and 22, which is equal to W in FIG. 5, and the perpendicular distance between the center of gravity 12 and a line extending between the first and second steering axes. This perpendicular distance is identified as L in FIG. 5. The length of the line extending between the first steering axis 21 and the center of gravity 12 is the hypotenuse of the triangle shown in FIG. 5 and can easily be determined. The magnitude of angle Φ is equivalent to the arctangent of the ratio of length L to the distance between the first steering axis 21 and the centerline 24, which is identified as W/2 in FIG. 5. Since the length of line H is known and the magnitude of angle H is known, the length of the moment arm M1 can be mathematically determined.

Figure 6:
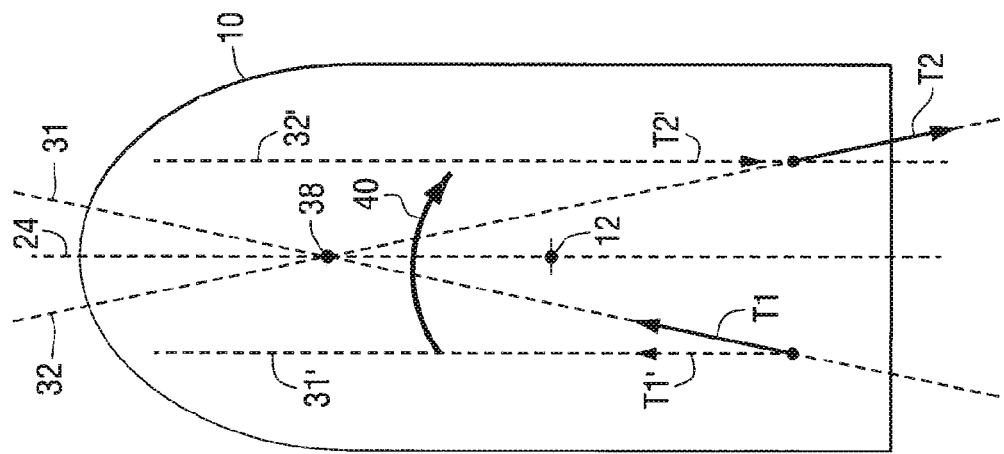
FIG. 6 depicts the arrangement of thrust vectors used to rotate the marine vessel of FIG.

As described above, a moment, represented by arrow 40 in FIG. 6, can be imposed on the marine vessel 10 to cause it to rotate about its center of gravity 12. The moment can be imposed in either rotational direction. In addition, the rotating force resulting from the moment 40 can be applied either in combination with a linear force on the marine vessel or alone. In order to combine the moment 40 with a linear force, the first and second thrust vectors, T1 and T2, are positioned to intersect at the point 38 illustrated in FIG. 6. The first and second thrust vectors, T1 and T2, are aligned with their respective dashed lines, 31 and 32, to intersect at this point 38 on the centerline 24 of the marine vessel. If, on the other hand, it is desired that the moment 40 be the only force on the marine vessel 10, with no linear forces, the first and second thrust vectors, represented by T1' and T2' in FIG. 6, are aligned in parallel association with each other. This, effectively, causes angle θ to be equal to 90 degrees. If the first and second thrust vectors, T1' and T2', are then applied with equal magnitudes and in opposite directions, the marine vessel 10 will be subjected only to the moment 40 and to no linear forces. This will cause the marine vessel 10 to rotate about its center of gravity 12 while not moving in either the forward/reverse or the left/right directions.

In FIG. 6, the first and second thrust vectors, T1 and T2, are directed in generally opposite directions and aligned to intersect at the point 38 which is not coincident with the center of gravity 12. Although the construction lines are not shown in FIG. 6, effective moment arms, M1 and M2, exist with respect to the first and second thrust vectors and the center of gravity 12. Therefore, a moment is exerted on the marine vessel 10 as represented by arrow 40. If the thrust vectors T1 and T2 are equal to each other and are exerted along lines 31 and 32, respectively, and these are symmetrical about the centerline 24 and in opposite directions, the net component forces parallel to the centerline 24 are equal to each other and therefore no net linear force is exerted on the marine vessel 10 in the forward/reverse directions. However, the first and second thrust vectors, T1 and T2, also resolve into forces perpendicular to the centerline 24 which are additive. As a result, the marine vessel 10 in FIG. 6 will move toward the right as it rotates in a clockwise direction in response to the moment 40.

In order to obtain a rotation of the marine vessel 10 with no lateral movement in the forward/reverse or left/right directions, the first and second thrust vectors, represented as T1' and T2' in FIG. 6, are directed along dashed lines, 31' and 32', which are parallel to the centerline 24. The first and second thrust vectors, T1' and T2', are of equal and opposite magnitude. As a result, no net force is exerted on the marine vessel 10 in a forward/reverse direction. Since angle θ, with respect to thrust vectors T1' and T2', is equal to 90 degrees, no resultant force is exerted on the marine vessel 10 in a direction perpendicular to the centerline 24. As a result, a rotation of the marine vessel 10 about its center of gravity 12 is achieved with no linear movement.

Figure 7:
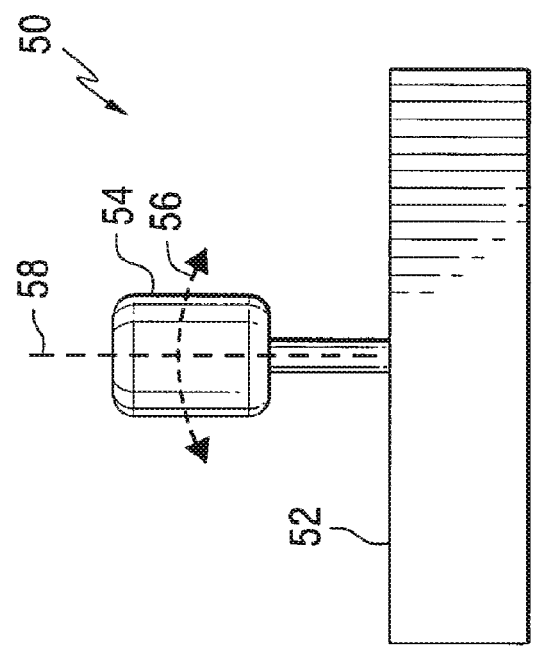
FIG. 7 is a schematic representation of a joystick used in conjunction with the marine vessel of FIG. 1.

FIG. 7 is a simplified schematic representation of a joystick 50 which provides a manually operable control device which can be used to provide a signal that is representative of a desired movement, selected by an operator, relating to the marine vessel. Many different types of joysticks are known to those skilled in the art. The schematic representation in FIG. 7 shows a base portion 52 and a handle 54 which can be manipulated by hand. In a typical application, the handle is movable in the direction generally represented by arrow 56 and is also rotatable about an axis 58. It should be understood that the joystick handle 54 is movable, by tilting it about its connection point in the base portion 52 in virtually any direction. Although dashed line 56 is illustrated in the plane of the drawing in FIG. 7, a similar type movement is possible in other directions that are not parallel to the plane of the drawing.

Figure 8:
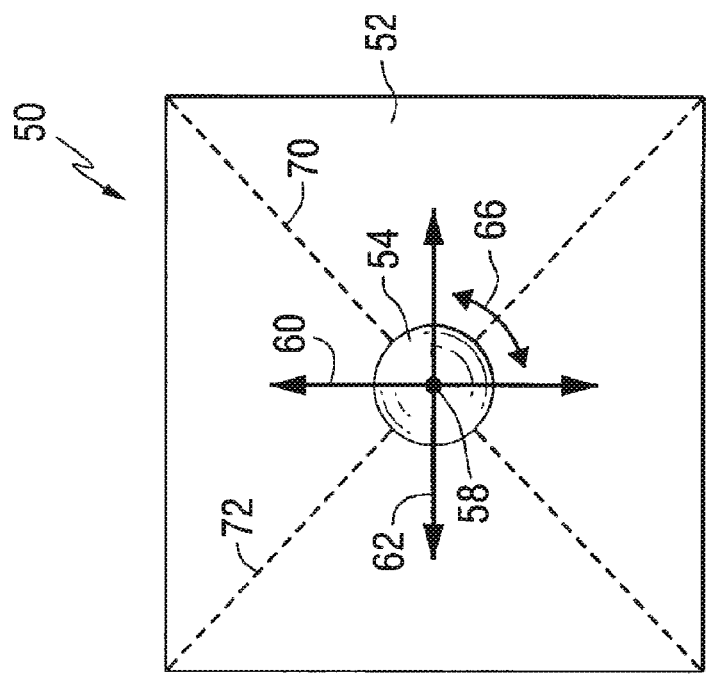
FIG. 8 is another schematic representation of a joystick used in conjunction with the marine vessel of FIG. 1.

FIG. 8 is a top view of the joystick 50. The handle 54 can move, as indicated by arrow 56 in FIG. 7, in various directions which include those represented by arrows 60 and 62. However, it should be understood that the handle 54 can move in any direction relative to axis 58 and is not limited to the two lines of movement represented by arrows 60 and 62. In fact, the movement of the handle 54 has a virtually infinite number of possible paths as it is tilted about its connection point within the base 52. The handle 54 is also rotatable about axis 58, as represented by arrow 66. Those skilled in the art are familiar with many different types of joystick devices that can be used to provide a signal that is representative of a desired movement of the marine vessel, as expressed by the operator of the marine vessel through movement of the handle 54.

With continued reference to FIG. 8, it can be seen that the operator can demand a purely linear movement either toward port or starboard, as represented by arrow 62, a purely linear movement in a forward or reverse direction as represented by arrow 60, or any combination of the two. In other words, by moving the handle 54 along dashed line 70, a linear movement toward the right side and forward or toward the left side and rearward can be commanded. Similarly, a linear movement along lines 72 could be commanded. Also, it should be understood that the operator of the marine vessel can request a combination of sideways or forward/reverse linear movement in combination with a rotation as represented by arrow 66. Any of these possibilities can be accomplished through use of the joystick 50. The magnitude, or intensity, of movement represented by the position of the handle 54 is also provided as an output from the joystick. In other words, if the handle 54 is moved slightly toward one side or the other, the commanded thrust in that direction is less than if, alternatively, the handle 54 was moved by a greater magnitude away from its vertical position with respect to the base 52. Furthermore, rotation of the handle 54 about axis 58, as represented by arrow 66, provides a signal representing the intensity of desired movement. A slight rotation of the handle about axis 58 would represent a command for a slight rotational thrust about the center of gravity 12 of the marine vessel 10. On the other hand, a more intense rotation of the handle 54 about its axis would represent a command for a higher magnitude of rotational thrust.

With reference to FIGS. 1-8, it can be seen that movement of the joystick handle 54 can be used by the operator of the marine vessel 10 to represent virtually any type of desired movement of the vessel. In response to receiving a signal from the joystick 50, an algorithm, in accordance with a preferred embodiment, determines whether or not a rotation 40 about the center of gravity 12 is requested by the operator. If no rotation is requested, the first and second marine propulsion devices are rotated so that their thrust vectors align, as shown in FIGS. 3 and 4, with the center of gravity 12 and intersect at that point. This results in no moment being exerted on the marine vessel 10 regardless of the magnitudes or directions of the first and second thrust vectors, T1 and T2. The magnitudes and directions of the first and second thrust vectors are then determined mathematically, as described above in conjunction with FIGS. 3 and 4.

If, on the other hand, the signal from the joystick 50 indicates that a rotation about the center of gravity 12 is requested, the first and second marine propulsion devices are directed along lines, 31 and 32, that do not intersect at the center of gravity 12. Instead, they intersect at another point 38 along the centerline 24. As shown in FIG. 6, this intersection point 38 can be forward from the center of gravity 12. The thrusts, T1 and T2, shown in FIG. 6 result in a clockwise rotation 40 of the marine vessel 10. Alternatively, if the first and second marine propulsion devices are rotated so that they intersect at a point along the centerline 24 which is behind the center of gravity 12, an opposite effect would be realized. It should also be recognized that, with an intersect point 38 forward from the center of gravity 12, the directions of the first and second thrusts, T1 and T2, could be reversed to cause a rotation of the marine vessel 10 in a counterclockwise direction.

Propellers do not have the same effectiveness when operated in reverse gear than they do when operated in forward gear for a given rotational speed. Therefore, with reference to FIG. 3, the first thrust T1 would not be perfectly equal to the second thrust T2 if the two propellers systems were operated at identical rotational speeds. In order to determine the relative efficiency of the propellers when they are operated in reverse gear, a relatively simple calibration procedure can be followed. With continued reference to FIG. 3, first and second thrusts, T1 and T2, are provided in the directions shown and aligned with the center of gravity 12. This should produce the sidle movement 30 as illustrated. However, this assumes that the two thrust vectors, T1 and T2, are equal to each other. In a typical calibration procedure, it is initially assumed that the reverse operating propeller providing the second thrust T2 would be approximately 80% as efficient as the forward operating propeller providing the first thrust vector T1. The rotational speeds were selected accordingly, with the second marine propulsion device operating at 125% of the speed of the first marine propulsion device. If a forward or reverse movement is experienced by the marine vessel 10, that initial assumption would be assumed to be incorrect. By slightly modifying the assumed efficiency of the reverse operating propeller, the system can eventually be calibrated so that no forward or reverse movement of the marine vessel 10 occurs under the situation illustrated in FIG. 3. In an actual example, this procedure was used to determine that the operating efficiency of the propellers, when in reverse gear, is approximately 77% of their efficiency when operated in forward gear. Therefore, in order to balance the first and second thrust vectors, T1 and T2, the reverse operating propellers of the second marine propulsion device would be operated at a rotational speed (i.e. RPM) which is approximately 29.87% greater than the rotational speed of the propellers of the first marine propulsion device. Accounting for the inefficiency of the reverse operating propellers, this technique would result in generally equal magnitudes of the first and second thrust vectors, T1 and T2.

Figure 9:
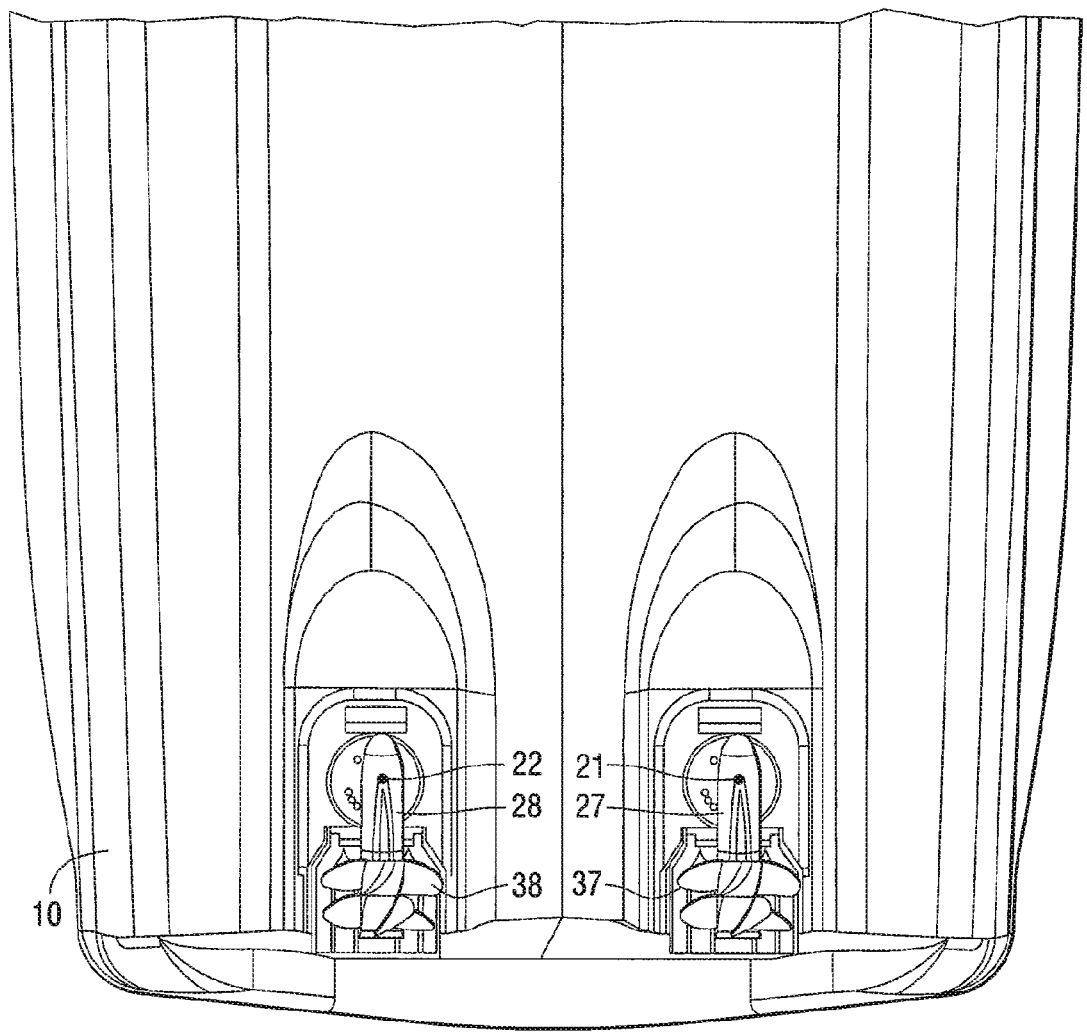
FIG. 9 is a bottom view of the hull of a marine vessel showing the first and second marine propulsion devices extending therethrough.

FIG. 9 is an isometric view of the bottom portion of a hull of a marine vessel 10, showing first and second marine propulsion devices, 27 and 28, and propellers, 37 and 38, respectively. The first and second marine propulsion devices, 27 and 28, are rotatable about generally vertical steering axes, 21 and 22, as described above. In order to avoid interference with portions of the hull of the marine vessel 10, the two marine propulsion devices are provided with limited rotational steering capabilities as described above. Neither the first nor the second marine propulsion device is provided, in a particularly preferred embodiment of the present disclosure, with the capability of rotating 360 degrees about its respective steering axis, 21 or 22.

Figure 10:
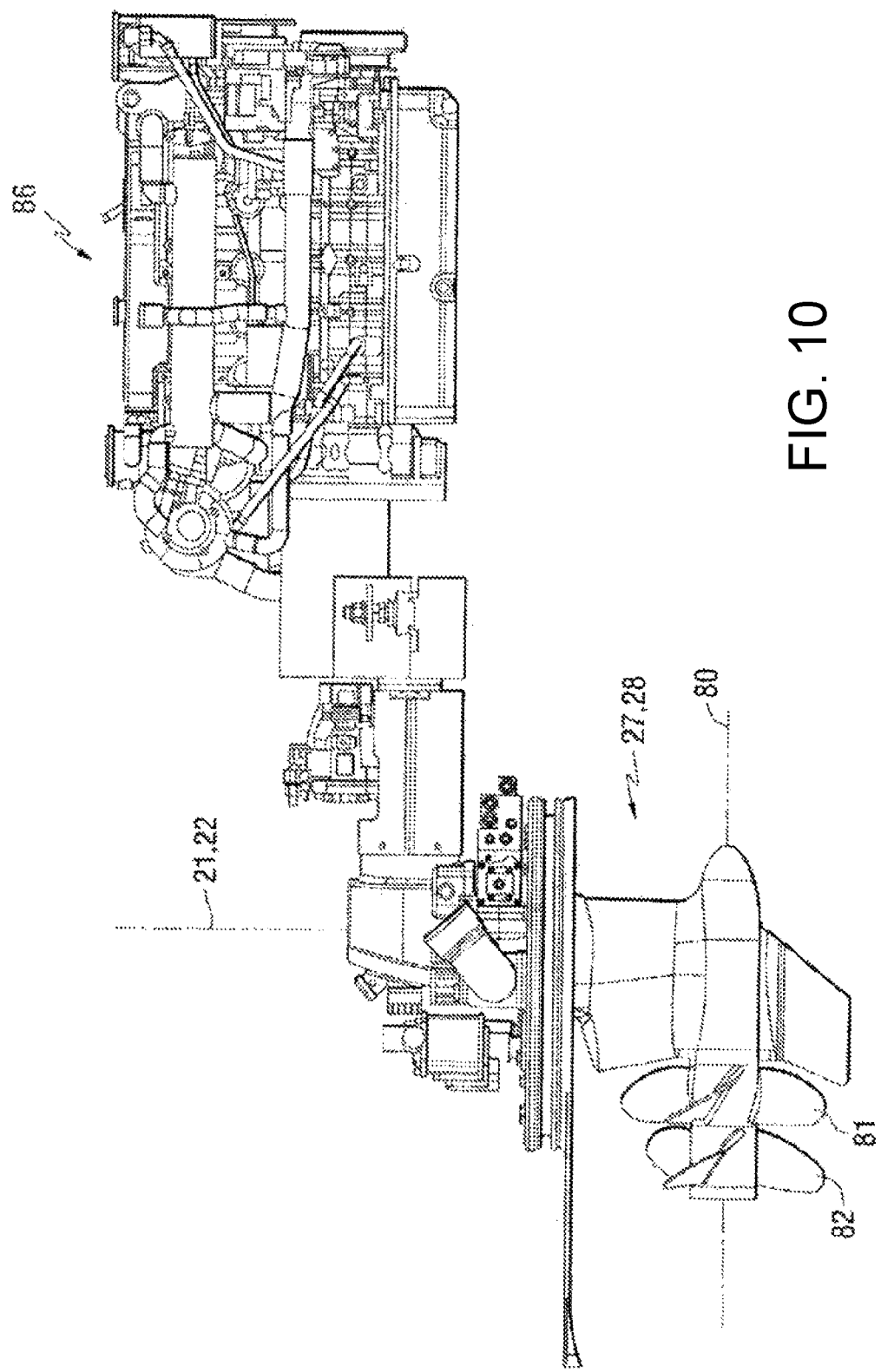
FIG. 10 is a side view showing the arrangement of an engine, steering mechanism, and marine propulsion device used in conjunction with the presently described embodiments.

FIG. 10 is a side view showing the arrangement of a marine propulsion device, such as 27 or 28, associated with a mechanism that is able to rotate the marine propulsion device about its steering axis, 21 or 22. Although not visible in FIG. 10, the driveshaft of the marine propulsion device extends vertically and parallel to the steering axis and is connected in torque transmitting relation with a generally horizontal propeller shaft that is rotatable about a propeller axis 80. The embodiment shown in FIG. 10 comprises two propellers, 81 and 82, that are attached to the propeller shaft. The motive force to drive the propellers, 81 and 82, is provided by an internal combustion engine 86 that is located within the bilge of the marine vessel 10. It is configured with its crankshaft aligned for rotation about a horizontal axis. In a particularly preferred embodiment, the engine 86 is a diesel engine. Each of the two marine propulsion devices, 27 and 28, is driven by a separate engine 86. In addition, each of the marine propulsion devices, 27 and 28, are independently steerable about their respective steering axes, 21 or 22. The steering axes, 21 and 22, are generally vertical and parallel to each other. They are not intentionally configured to be perpendicular to the bottom surface of the hull. Instead, they are generally vertical and intersect the bottom surface of the hull at an angle that is not equal to 90 degrees when the bottom surface of the hull is a V-type hull or any other shape which does not include a flat bottom.

With continued reference to FIG. 10, the submerged portion of the marine propulsion device, 27 or 28, contains rotatable shafts, gears, and bearings which support the shafts and connect the driveshaft to the propeller shaft for rotation of the propellers. No source of motive power is located below the hull surface. The power necessary to rotate the propellers is solely provided by the internal combustion engine. Alternate propulsion means could be employed such as an electronic motor and/or the like.

Figure 11:
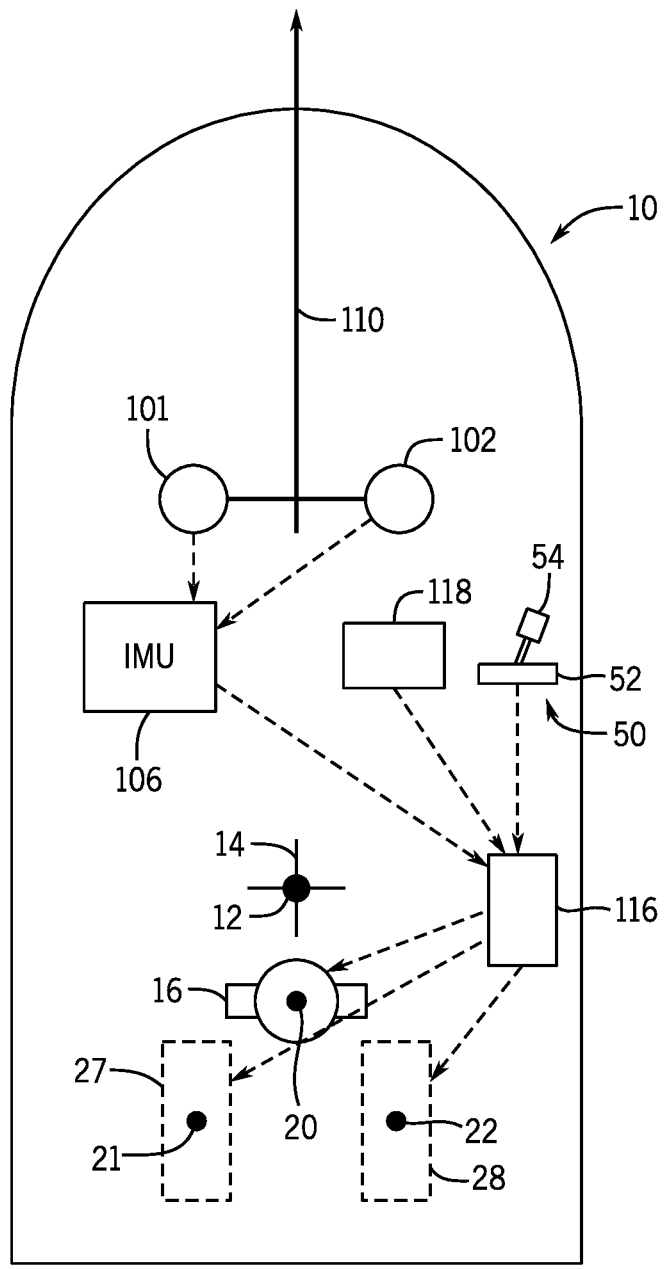
FIG. 11 is a schematic representation of a marine vessel equipped with the devices for performing the gyroscope-optimizing functions of the presently described embodiments.

FIG. 11 is a schematic representation of a marine vessel 10 which is configured to perform the steps of a preferred embodiment relating to a method for maintaining a marine vessel in a selected position. The marine vessel 10 is provided with a global positioning system (GPS) which, in a preferred embodiment, comprises a first GPS device 101 and a second GPS device 102 which are each located at a preselected fixed position on the marine vessel 10. Signals from the GPS devices are provided to an inertial measurement unit (IMU) 106. In certain embodiments of the IMU 106, it comprises a differential correction receiver, accelerometers, angular rate sensors, and a microprocessor which manipulates the information obtained from these devices to provide information relating to the current position of the marine vessel 10, in terms of longitude and latitude, the current heading of the marine vessel 10, represented by arrow 110 in FIG. 11, and the velocity and acceleration of the marine vessel 10 in six degrees of freedom.

FIG. 11 also shows a microprocessor or controller 116 which receives inputs from the IMU 106. The microprocessor 116 also receives information from a device 118 which allows the operator of the marine vessel 10 to provide manually selectable modes of operation. As an example, the device 118 can be an input screen that allows the operator of the marine vessel to manually select various modes of operation associated with the marine vessel 10. One of those selections made by the operator of the marine vessel can provide an enabling signal which informs the microprocessor 116 that the operator desires to operate the vessel 10 in a station keeping mode in order to maintain the position of the marine vessel in a selected position. In other words, the operator can use the device 118 to activate the present system so that the marine vessel 10 is maintained at a selected global position (e.g. a selected longitude and latitude) and a selected heading (e.g. with arrow 110 being maintained at a fixed position relative to a selected compass point).

With continued reference to FIG. 11, a manually operable control device, such as the joystick 50, can also be used to provide a signal to the microprocessor 116. As described above, the joystick 50 can be used to allow the operator of the marine vessel 10 to manually maneuver the marine vessel. It can also provide information to the microprocessor 116 regarding its being in an active status or inactive status. While the operator is manipulating the joystick 50, the joystick is in an active status. However, if the operator releases the joystick 50 and allows the handle 54 to return to its centered and neutral position, the joystick 50 reverts to an inactive status.

As described above, the first and second marine propulsion devices, 27 and 28, are steerable about their respective axes, 21 and 22. Signals provided by the microprocessor 116 allow the first and second marine propulsion devices to be independently rotated about their respective steering axes in order to coordinate the movement of the marine vessel 10 in response to operator commands.

As was also described above, the orientation of the precession and spin axes 18, 20 of the gyroscopic stabilizer 16 can be modified to generate a control torque having a desired orientation. Signals provided by the microprocessor 116 to the gyroscopic stabilizer 16 direct the orientation of the precession and spin axes 18, 20, as well as the spin rate of the flywheel to achieve the desired control torque.

Figure 12:
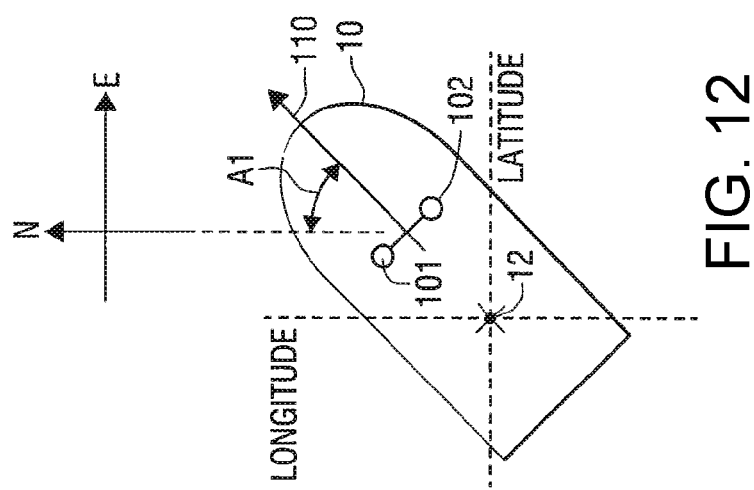
FIG. 12 illustrates a marine vessel at a particular global position and with a particular global heading.

FIG. 12 shows a marine vessel 10 at an exemplary global position, measured as longitude and latitude, and an exemplary heading represented by angle A1 between the heading arrow 110 of the marine vessel 10 and a due north vector. Although alternative position defining techniques can be used in conjunction with the presently described embodiments, a preferred embodiment uses both the global position and heading of the vessel 10 for the purpose of determining the current position of the vessel and calculating the necessary position corrections to return the vessel to its position.

As described above, GPS devices, 101 and 102, are used by the IMU 106 to determine the information relating to its position. For purposes of describing a preferred embodiment, the position will be described in terms of the position of the center of gravity 12 of the marine vessel and a heading vector 110 which extends through the center of gravity. However, it should be understood that alternative locations on the marine vessel 10 can be used for these purposes. The IMU 106, described above in conjunction with FIG. 11, provides a means by which this location on the marine vessel 10 can be selected.

The station keeping function, where it maintains the desired global position and desired heading of the marine vessel, can be activated in several ways. In a simple embodiment, the operator of the marine vessel 10 can actuate a switch that commands the microprocessor 116 to maintain the current position whenever the switch is actuated. In a particularly preferred embodiment, the station keeping mode is activated when the operator of the marine vessel enables the station keeping, or position maintaining, function and the joystick 50 is inactive. If the station keeping mode is enabled, but the joystick is being manipulated by the operator of the marine vessel 10, a preferred embodiment temporarily deactivates the station keeping mode because of the apparent desire by the operator of the marine vessel to manipulate its position manually. However, as soon as the joystick 50 is released by the operator, this inactivity of the joystick in combination with the enabled station keeping mode causes the preferred embodiment of to resume its position maintaining function.

Figure 13:
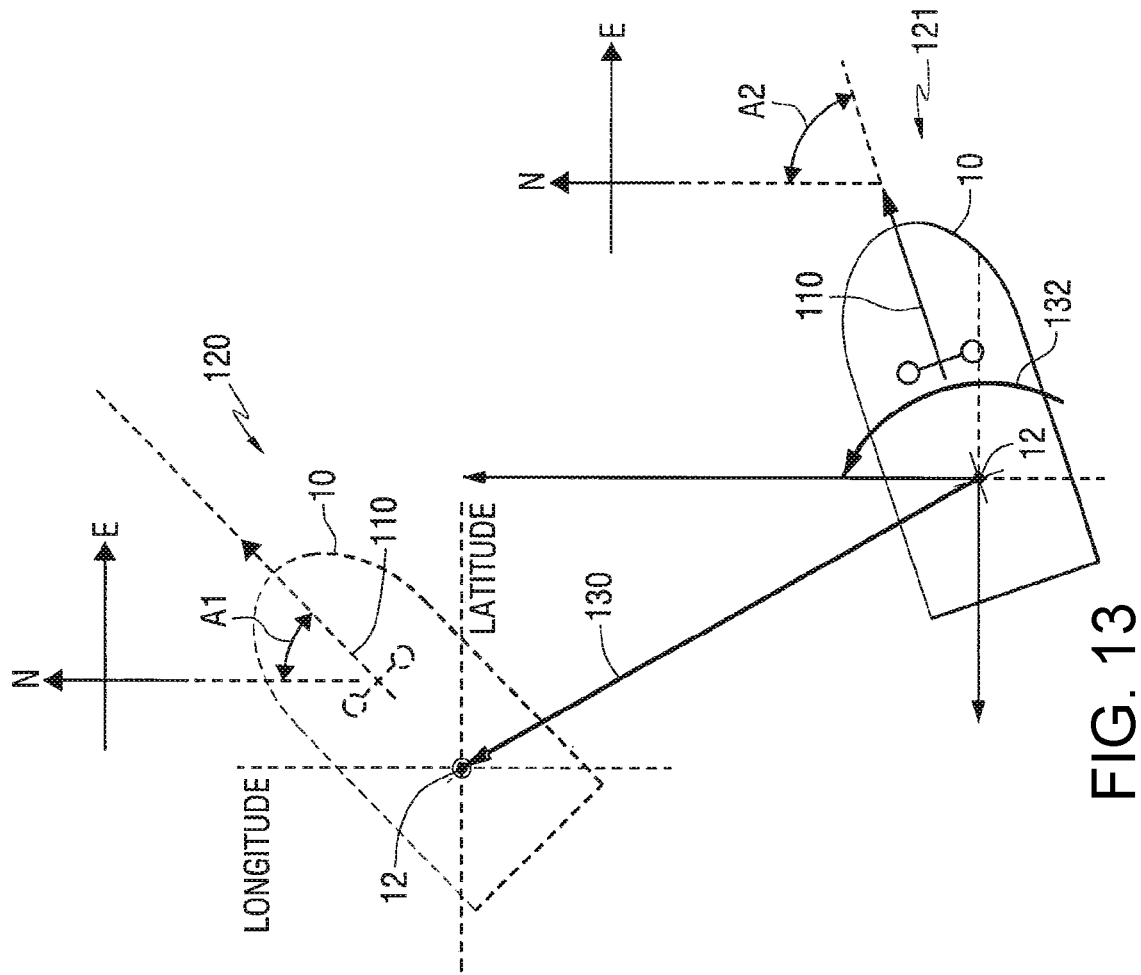
FIG. 13 depicts the movement of a marine vessel from an initial position to a subsequent position.

FIG. 13 is a schematic representation that shows the marine vessel 10 in two exemplary positions. An initial, or desired, position 120 is generally identical to that described above in conjunction with FIG. 12. Its initial position is defined by a global position and a heading. The global position is identified by the longitude and latitude of the center of gravity 12 when the vessel 10 was at its initial, or desired, position 120. The heading, represented by angle A1, is associated with the vessel heading when it was at its initial position 120.

Assuming that the vessel 10 moved to a subsequent position 121, the global position of its center of gravity 12 moved to the location represented by the subsequent position 121 of the vessel 10. In addition, the marine vessel 10 is illustrated as having rotated slightly in a clockwise direction so that its heading vector 110 is now defined by a larger angle A2 with respect to a due north vector.

With continued reference to FIG. 13, it should be understood that the difference in position between the initial position 120 and the later position 121 is significantly exaggerated so that the response by the system can be more clearly described. A preferred embodiment determines a difference between a desired position, such as the initial position 120, and the current position, such as the subsequent position 121 that resulted from the vessel 10 drifting. This drift of the vessel 10 can occur because of wind, tide, or current.

The current global position and heading of the vessel is compared to the previously stored desired global position and heading. An error, or difference, in the north, east and heading framework is computed as the difference between the desired global position and heading and the actual global position and heading. This error, or difference, is then converted to an error, or difference, in the forward, right and heading framework of the vessel which is sometimes referred to as the body framework. These vessel framework error elements are then used by the control strategies that will be described in greater detail below which attempt to simultaneously null the error, or difference, elements. Through the use of a PID controller, a desired force is computed in the forward and right directions, with reference to the marine vessel, along with a desired yaw moment relative to the marine vessel in order to null the error elements. The computed force and moment elements are then transmitted to the vessel maneuvering system described above which delivers the requested forces and moments by positioning the independently steerable marine propulsion drives, controlling the power provided to the propellers of each drive, and controlling the thrust vector directions of both marine propulsion devices.

The difference between the desired position 120 and the current position 121 can be reduced if the marine vessel 10 is subjected to an exemplary target linear thrust 130 and a target moment 132. The target linear thrust 130 and the target moment 132, in a preferred embodiment, are achieved by a manipulation of the first and second marine propulsion devices as described above in conjunction with FIGS. 3-6. The target linear thrust 130 will cause the marine vessel 10 to move towards its initial, or desired, position which is measured as a magnitude of longitude and latitude. The target moment 132 will cause the marine vessel 10 to rotate about its center of gravity 12 so that its heading vector 110 moves from the current position 121 to the initial position 120. This reduces the heading angle from the larger magnitude of angle A2 to the smaller magnitude of A1. Both the target linear thrust 130 and target moment 132 are computed to decrease the errors between the current global position and heading at location 121 and the desired global position and heading at the desired position 120.

With continued reference to FIG. 13, it should be recognized that the station keeping mode is not always intended to move the marine vessel 10 by significant distances. Instead, its continual response to slight changes in global position and heading will more likely maintain the vessel in position without requiring perceptible movements of the vessel 10. In other words, the first and second marine propulsion devices are selectively activated in response to slight deviations in the global position and heading of the marine vessel and, as a result, large corrective moves such as that which is illustrated in FIG. 13 will not normally be required. As a result, the thrusts provided by the first and second marine propulsion devices continually counter the thrusts on the marine vessel caused by wind, current, and tide so that the net result is an appearance that the marine vessel is remaining stationary and is unaffected by the external forces. However, alternative embodiments could be used to cause the marine vessel 10 to move to a position, defined by a desired global position and heading, that was previously stored in the microprocessor memory. Under those conditions, a relatively larger target linear thrust 130 and target moment 132 could be used to move the vessel 10 to the initial position when that initial position is selected from memory and the station keeping mode is enabled. As an example of this alternate embodiment, a desired position, such as the position identified by reference numeral 120 in FIG. 13, can be stored in the microprocessor and then recalled, perhaps days later, after the operator of the marine vessel 10 has moved the marine vessel to a position in the general vicinity of the stored position 120. In other words, if the operator of the marine vessel maneuvers it to a location, such as the location identified by reference numeral 121 in FIG. 13, the system can be enabled and activated. Under those conditions, the system will cause the marine vessel to move to its stored desired position 120 that was selected and saved at some previous time. This technique could possibly be advantageous in returning the marine vessel to a desirable fishing location or to a docking position after the operator has maneuvered the marine vessel into a position that is generally close to the desired position.

In a particularly preferred embodiment, the microprocessor 116, as described above in conjunction with FIG. 11, allows the operator to manually manipulate the joystick 50 so that the marine vessel is positioned in response to the desire of the operator. As this process continues, the operator of the marine vessel may choose to release the joystick 50. At that instant in time, the station keeping mode is immediately activated, if enabled, and the marine vessel is maintained at the most recent position and heading of the vessel 10 when the joystick 50 initially became inactive as the operator released it. The operator could subsequently manipulate the joystick again to make slight corrections in the position and heading of the vessel. As that is being done, the station keeping mode is temporarily deactivated. However, if the operator of the marine vessel again releases the joystick 50, its inactivity will trigger the resumption of the station keeping method if it had been previously enabled by the operator.

Figure 14:
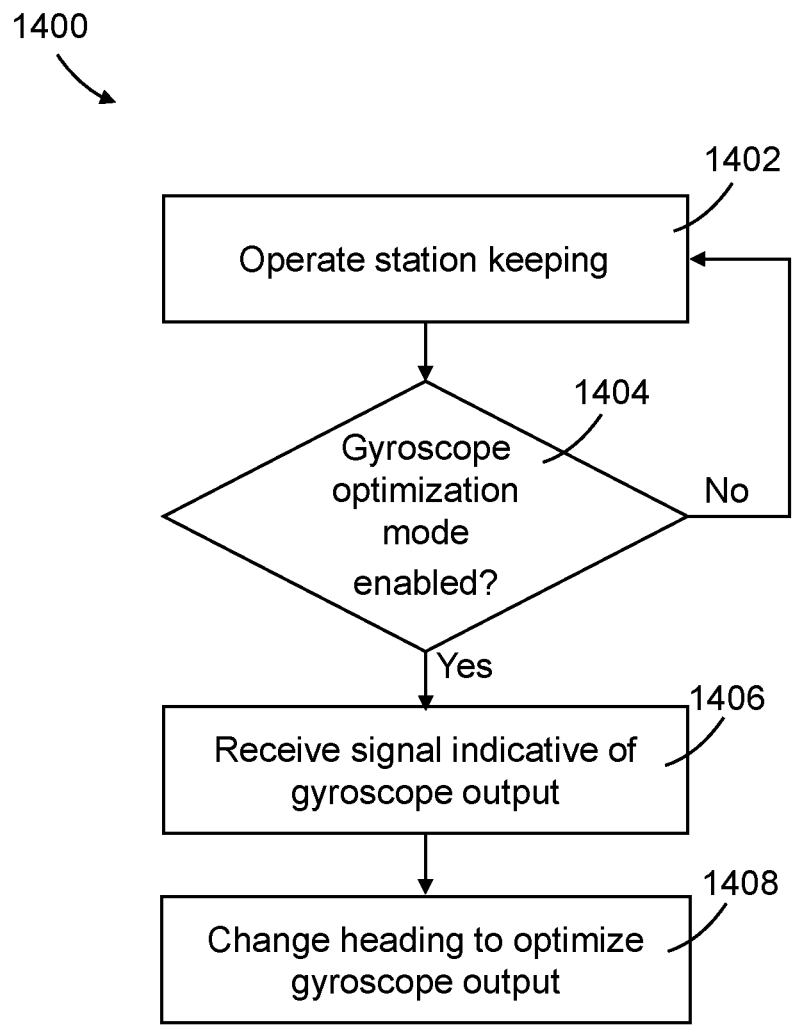
FIG. 14 is a flow chart depicting a gyroscope optimization station keeping process.
Figure 15:
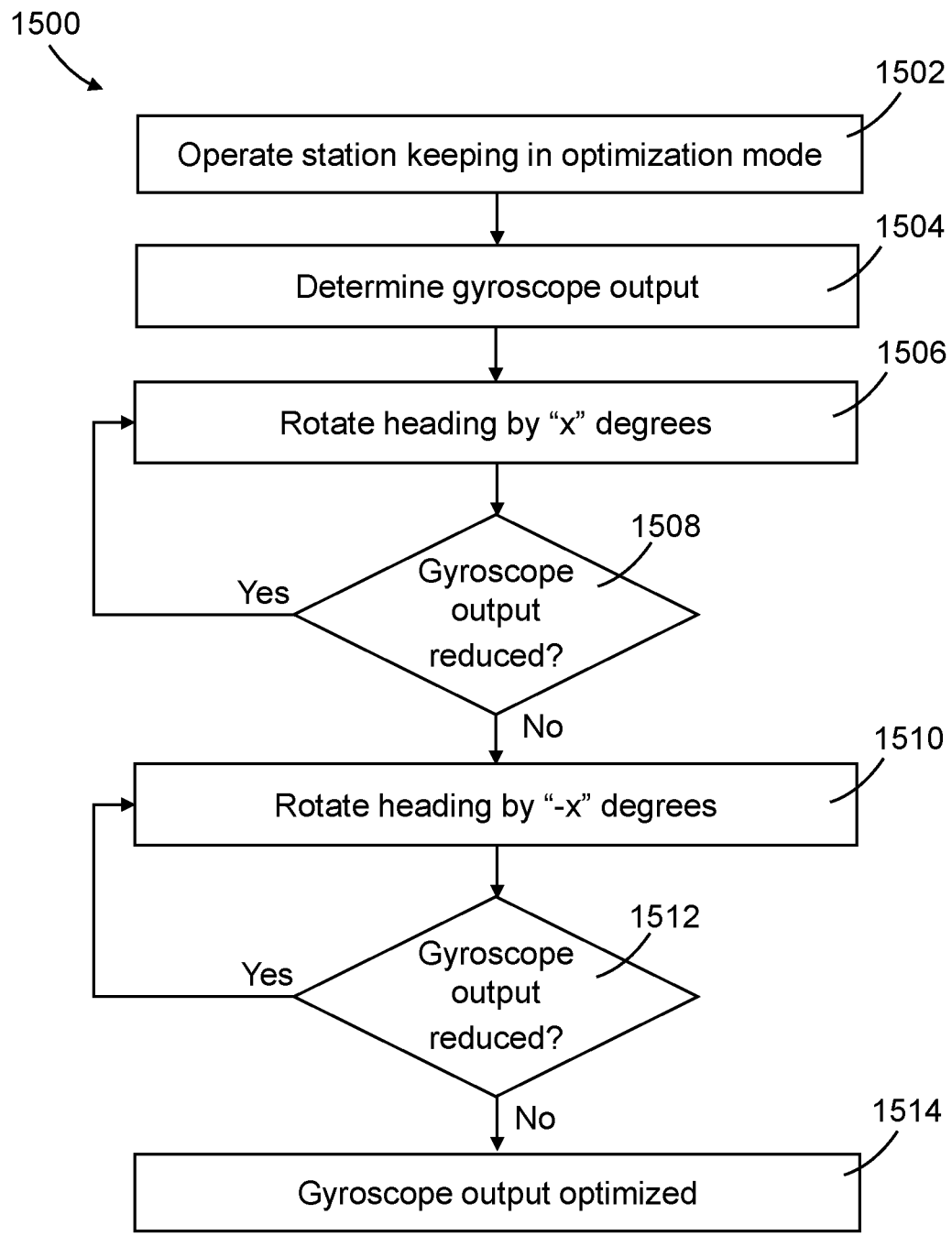
FIG. 15 is a flow chart depicting a heading search method used in a gyroscope optimization station keeping process

Referring now to FIG. 14, a gyroscope optimization station keeping process 1400 is depicted. Process 1400 may be performed using the marine vessel 10, depicted and described above with reference to FIGS. 1-13. In an exemplary implementation, process 1400 is performed at least in part by the microprocessor or controller 116. Process 1400 is shown to commence with step 1402, in which the controller 116 operates the marine vessel 10 in station keeping mode. As described above with reference to FIGS. 12 and 13, the station keeping function generally maintains a desired global position (i.e., as indicated by the position of the center of gravity 12) and desired heading (i.e., as indicated by the angle A1) of the marine vessel 10.

At step 1404, the controller 116 determines whether a gyroscope optimization mode has been enabled by the operator of the marine vessel 10. In an exemplary implementation, the operator may choose to enable the gyroscope optimization mode using a user input device (e.g., joystick 50). If the controller 116 determines that the operator has not enabled the gyroscope optimization mode, process 1400 reverts to step 1402, and the controller 116 operates the station keeping under nominal conditions, that is, maintaining a global position and heading of the marine vessel 10 irrespective of the energy required by the gyroscopic stabilizer system 16 to dampen the wave and wind effects on the marine vessel 10 at the selected heading.

If, however, the controller 116 determines at step 1404 that the operator has enabled the gyroscope optimization mode, process 1400 advances to step 1406 and the controller 116 receives a signal indicative of the output of the gyroscopic stabilizer system 16. In some embodiments, the signal indicative of the output may be the direct magnitude of the control torque generated by the gyroscopic stabilizer system 16. In other implementations, the signal indicative of the output may be indirectly provided via pitch and/or roll measurements provided by the IMU 106. In other words, since the control torque outputs provided by the gyroscopic stabilizer system 16 correspond with the magnitude of the pitch and/or roll experienced by the marine vessel 10, a larger pitch and/or roll measurement provided by the IMU 106 will indicate a larger magnitude output by the gyroscopic stabilizer system 16.

At step 1406, the controller 116 operates the marine propulsion devices 27, 28 to change the heading of the marine vessel 10 and optimize the output of the gyroscopic stabilizer system 16. Further details regarding this heading search process are included below with reference to FIG. 15. In some implementations, the nominal operations of the gyroscopic stabilizer system 16 may be overridden such that torques generated by the system 16 are used to aid, rather than oppose, the yaw motion of the marine vessel 10 due to the thrusts generated by the marine propulsion devices 27, 27. Additional details regarding the integration of gyroscopic stabilizer systems with propulsion devices for close quarter maneuvers can be found in co-pending U.S. patent application Ser. No. 17/391,419, filed Aug. 2, 2021 and incorporated by reference herein.

As described above, FIG. 15 depicts a heading search process 1500 that may be performed at least in part by the microprocessor or controller 116 of the marine vessel 10 to optimize the control torque outputs of the gyroscopic stabilizer system 16. Process 1500 is shown to commence with steps 1502 and 1504, in which the controller 116 determines that station keeping has been enabled in gyroscope optimizer mode (see step 1404 above) and determines the output of the gyroscopic stabilizer system 16 at the current heading. As described above, the output of the stabilizer system 16 may be received at the controller 116 either directly in the form of the magnitude of the control torque, or indirectly in the form of pitch and/or roll measurements provided by the IMU 106.

At step 1506, the controller 116 operates the marine propulsion devices 27, 28, and in some implementations, the gyroscopic stabilizer system 16, to rotate the heading by a predetermined positive amount or number of positive "X" degrees. At step 1508, the controller 116 determines whether the output of the gyroscopic stabilizer system 16 has been reduced. If the output has been reduced by at least a predetermined change amount, process 1500 reverts to step 1506 and the controller 116 continues to rotate the heading by the predetermined positive amount (i.e., rotation continues in the same direction). The predetermined change amount may vary by vessel, and may be primarily determined by the capabilities of the gyroscopic stabilizer system 16 and its amount of "reserve" torque after a major input is provided. All suitable gyroscopic stabilizer systems are self-limiting in their total output.

If, however, the controller 116 determines at step 1508 that the gyroscopic output has not been reduced by at least the predetermined change amount, process 1500 proceeds to step 1510, and the controller 116 rotates the heading by a predetermined negative amount or number of negative "X" degrees (i.e., the opposite direction). At step 1512, the controller 116 determines whether the output of the gyroscopic stabilizer system 16 has been reduced by the predetermined change amount. If the output has been reduced by at least the predetermined change amount, process 1500 reverts to step 1510 and the controller 116 continues to rotate the heading by the predetermined negative amount.

Once the controller 116 determines at step 1512 that no further reductions in gyroscope output are achievable, process 1500 concludes at step 1514, in which the gyroscopic output of the system 16 has been optimized. Once the output has been optimized, the controller 116 may maintain the optimized heading for a certain period of time. The period of time a heading is maintained before the search process 1500 is repeated may be user-configurable, or may be increased or decreased based on the conditions experienced by the marine vessel 10. For example, the controller 116 may perform process 1500 more frequently when the marine vessel 10 is experiencing choppy conditions, as less frequently when the marine vessel 10 is experiencing calm conditions.

In some implementations, the predetermined amount of heading rotation and the predetermined change amount may also be user-configurable and selected by an operator using a user input device (e.g., joystick 50). Smaller amounts may result in more precise optimization of the gyroscope output, but may extend the length of time that the controller 116 performs the heading search process. In other implementations, the controller 116 may automatically adjust the predetermined amount of heading rotation. For example, if the controller 116 receives a gyroscopic output that is particularly high or otherwise exceeds a threshold at a certain heading, the controller 116 may automatically increase the predetermined amount of heading rotation under the assumption that nearby headings are likely to result in unfavorable output as well.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A system for orienting a marine vessel, comprising:
a plurality of marine propulsion devices;
a gyroscopic stabilizer system; and
a controller operably coupled to the plurality of marine propulsion devices and the gyroscopic stabilization system, wherein the controller is configured to control operation of the plurality of marine propulsion devices to minimize a control torque output of the gyroscopic stabilizer system while maintaining the marine vessel in a selected global position.

2. The system of claim 1, wherein the control torque is configured to dampen at least one of pitch and roll of the marine vessel in the selected global position.

3. The system of claim 1, wherein the controller is further configured to operate the gyroscopic stabilizer system consistent with the plurality of marine propulsion devices to change a heading of the marine vessel.

4. The system of claim 1, further comprising an inertial measurement unit configured to measure at least one of pitch and roll of the marine vessel in the global position.

5. The system of claim 4, wherein the controller is operably connected to the inertial measurement unit and configured to receive the at least one of pitch and roll from the inertial measurement unit.

6. The system of claim 5, wherein the controller is configured to control operation of the plurality of marine propulsion devices to minimize the control torque output of the gyroscopic stabilizer system by minimizing the at least one of pitch and roll received from the inertial measurement unit.

7. The system of claim 1, wherein the controller is configured to control operation of the plurality of marine propulsion devices to minimize a control torque output of the gyroscopic stabilizer system by performing a heading search process.

8. The system of claim 7, wherein the heading search process comprises:
measuring a first control torque output of the gyroscopic stabilizer system;
changing a heading of the marine vessel by a predetermined heading amount in a first direction;
measuring a second control torque output of the gyroscopic stabilizer system; and
repeating the preceding steps if the first control torque output is greater than the second control torque output by at least a predetermined change amount.

9. The system of claim 8, wherein the heading search process further comprises:
changing the heading of the marine vessel by the predetermined heading amount in a second direction that is opposite the first direction if the first control torque output is less than the second control torque output.

10. The system of claim 8, wherein the system further comprises a user input device configured to permit a user to select at least one of the predetermined heading amount and the predetermined change amount.

11. The system of claim 8, wherein the controller is configured to increase the predetermined heading amount if the first control torque output or the second control torque output exceeds a torque output threshold.

12. A method for orienting a marine vessel, comprising:
determining a first control torque output of a gyroscopic stabilizer system;
changing a heading of the marine vessel by a predetermined heading amount in a first direction by operating a plurality of marine propulsion devices;
determining a second control torque output of the gyroscopic stabilizer system; and
repeating the preceding steps if the first control torque output is greater than the second control torque output by at least a predetermined change amount.

13. The method of claim 12, wherein the method further comprises:
changing the heading of the marine vessel by the predetermined heading amount in a second direction that is opposite the first direction if the first control torque is less than the second control torque output.

14. The method of claim 12, wherein at least one of the predetermined heading amount and the predetermined change amount is configurable by a user.

15. The method of claim 12, wherein the predetermined amount is automatically increased if the first control torque output or the second control torque output exceeds a torque output threshold.

16. The method of claim 12, changing the heading of the marine vessel by a predetermined amount in a first direction further comprises operating the gyroscopic stabilizer system consistent with the plurality of marine propulsion devices.

17. The method of claim 12, wherein the method is performed while maintaining the marine vessel in a selected global position.

18. The method of claim 17, wherein the first control torque and the second control torque are configured to dampen at least one of pitch and roll of the marine vessel in the selected global position.

19. The method of claim 18, further comprising receiving the at least one of pitch and roll from an inertial measurement unit.

20. The method of claim 19, wherein the first control torque output is determined based on the at least one of pitch and roll received from the inertial measurement unit.

* * * * *